Jan. 11, 1955     A. L. HUBBARD     2,699,027
COTTON PICKER DOFFING MEANS
Filed May 5, 1953
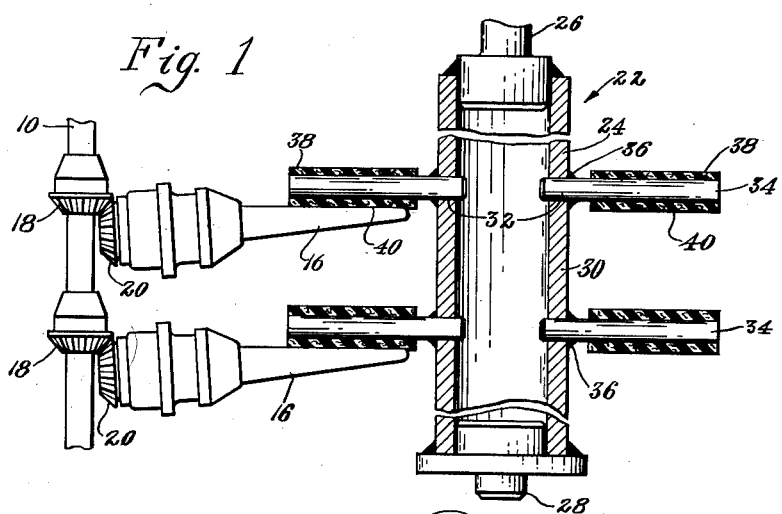
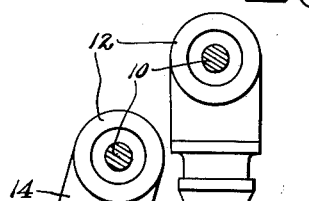
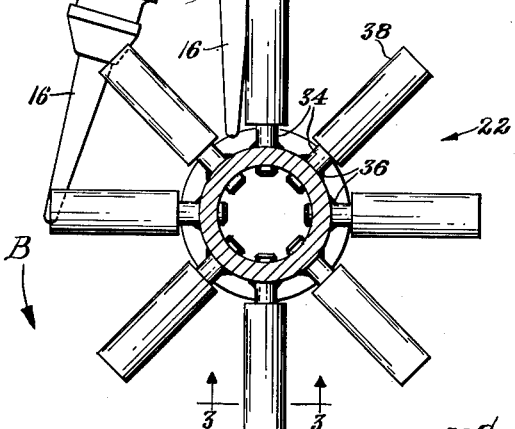
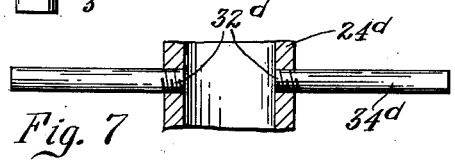
INVENTOR.
Arthur L. Hubbard
BY
Attorneys

United States Patent Office 2,699,027
Patented Jan. 11, 1955

2,699,027

COTTON PICKER DOFFING MEANS

Arthur L. Hubbard, Madrid, Iowa, assignor to Deere Manufacturing Co., Dubuque, Iowa, a corporation of Iowa Application May 5, 1953, Serial No. 353,120

13 Claims. (Cl. 56—41)

This invention relates to doffing means for a cotton picker and more particularly to improvements in the doffing means per se in which the principal objects of the invention are to provide a doffer that is relatively inexpensive, one that may be readily kept in condition by replacing various parts thereof from time to time, and one that may be utilized in machines of existing designs.

The conventional cotton picker of the spindle type comprises one or more cotton-picking drums mounted on upright axes and having a plurality of columns arranged about those axes, from each of which columns projects a series of vertically spaced spindles (barbed or otherwise). The drums are arranged in a mobile frame so that as the machine advances, plants in a cotton row are received between a pair of cooperating drums so that the spindles or fingers project into the plants and pick the cotton therefrom. The drums, as well as the spindles, rotate as the machine advances and the moving spindles are caused to pass through doffing means. Broadly, the doffing means comprises an upright shaft on which is a plurality of disks or equivalent means spaced apart vertically on the order of the spacing of the series or layers of spindles. The purpose of each doffer in each doffing means is to engage the cotton on the associated spindles and to remove that cotton by a wiping or brushing action.

The fundamental principles just outlined have been known for many years and the present development of the industry concerned with cotton-picking machines is improvement in various important details expected to minimize the complexity of the machine and to cut down as much as possible the cost of maintenance. It has been found that the individual doffers in the conventional cotton picker wear to a considerable extent and must be replaced from time to time. If the doffers are designed in such manner that they are assembled on a shaft to form an integral structure, replacement of one or more doffers requires disassembly of the entire shaft, before which the shaft itself must be removed from the machine. Various efforts have heretofore been made to provide individual doffing elements that will eliminate the difficulty just referred to, but in the main these have not proved entirely successful. According to the present invention, the difficulty is solved by the provision of a doffer comprising a central main supporting shaft from which a plurality of fingers project in spoke-like fashion and each spoke or spike is equipped with a removable and replaceable doffing sleeve. In one form of the invention, the spikes are of circular cross section and the sleeve utilized is a section of conventional hose of proper size cut to appropriate length and slipped onto the associated spike, the fit between the spike and the sleeve being such that the sleeve is normally not removable but may be forcibly removed for replacement. It is a feature of the invention that the sleeve may be rotated through 90 or 180° to present a new doffing surface as the original surface becomes worn. In other forms of the invention, the spike takes a different cross-sectional shape and the sleeve is accommodated thereto so that normally the sleeve does not rotate angularly relative to the spike but may be forcibly rotated to present other doffing surfaces as the preceding doffing surfaces wear. In still another form of the invention, it is a feature to provide a sleeve having a thickened original doffing surface. In all instances, the sleeve may be readily removed and replaced without in any way at all disturbing other sleeves or other parts of the doffing means.

The foregoing and other important objects and desirable features inherent in and encompassed by the invention will become apparent as a preferred disclosure of various forms of the invention are made in the following specification and accompanying drawings, in which Fig. 1 is a fragmentary elevational view with parts broken away and shown in section showing part of the doffing means associated with cotton-picking spindles of one conventional type.

Fig. 2 is a plan view, with parts broken away and shown in section, of the structure shown in Fig. 1.

Fig. 3 is a transverse sectional view, on an enlarged scale, as seen substantially along the line 3—3 of Fig. 2.

Fig. 4 is a view similar to Fig. 3, but showing another form of the invention.

Fig. 5 is a view similar to Figs. 3 and 4, but showing still another form of the invention.

Fig. 6 is a view similar to Figs. 3, 4 and 5, but showing still another form of the invention.

Fig. 7 is a sectional view of a modified form of doffing element in which the main doffer assembly may be made up of a plurality of threaded-in rather than welded-in spikes.

A conventional cotton picker will include a drum (not shown in detail here) comprising a plurality of upright shafts 10 grouped around the drum axis and arranged, by conventional mechanism not deemed important here, to travel in an orbit as the machine of which the drum forms a part with other drums advances. Each shaft 10 is enclosed in a column or upright picker bar (Fig. 2) designated generally by the numeral 12, each picker bar including a generally radially outwardly projecting bearing portion 14 in which is journaled a rotatable picker spindle or finger 16. These spindles may or may not be barbed. Whether they are or are not is immaterial here. In one well-known type of cotton picker, there may be as many as twelve columns 12 arranged about the axis of the drum. Each column will carry twenty spindles or fingers 16, vertically spaced on the order illustrated in Fig. 1. Each shaft 10 includes as many bevel pinions 18 as there are spindles 16, each spindle having a meshing bevel pinion 20. In this manner, each spindle 16 is rotated around its own axis as the columns 12 travel in their orbit about the drum axis.

As stated above, the drums operate in pairs and the spindles of each project into and are withdrawn from a row of cotton plants. While the spindles are rotating within the plant row, they accumulate cotton thereon and as they pass out of the plant row, they pass through an associated doffer means, designated generally by the numeral 22. The general direction of movement of the spindles 16 as they sweep through their orbital travel is designated by the arrow A in Fig. 2. The doffing means 22 rotates in the direction of the arrow B, also shown in Fig. 2. It will be observed that the spindle 16 shown to the left reaches, at one stage of its travel, a position in which its axis is tangent to a circle having the axis of the doffer 22 as its center. Thus, as the doffer rotates in the direction of the arrow B, the cotton on the spindle 16 is removed endwise or toward the tapered or smaller end of the spindle, all of which is generally conventional.

The doffing means 22, shown in Fig. 1, comprises a rotatable central support in the form of an upright tubular shaft 24 having respectively at its upper and lower ends stub shafts 26 and 28 which provide means whereby the doffer assembly may be readily mounted in a machine in association with the picking means with which it cooperates. Portions of the shaft 24 have been omitted in Fig. 1, but it will be understood that the shaft is considerably elongated over what is shown, being of a length commensurate with the height of a drum having twenty cotton picker spindles 16 as suggested above.

The tubular shaft has, of course, an annular wall, bearing the numeral 30 for purposes of further identification. This wall has a plurality of axially spaced circular rows of apertures 32. The circular rows of apertures are, of course, spaced along the axis of the shaft and there are as many rows of apertures as there are picker spindles 16.

The central support or shaft 24 carries a plurality of circumferentially spaced elongated members 34 projecting therefrom in spoke-like fashion. In Figs. 1, 2, 3 and 4, each member 34 is in the form of a spike of circular cross section, and its inner end is rigidly secured to the central rotatable support or shaft 34 by means of being inserted into an associated aperture 32 and welded to the annular wall 30 as at 36.

Each spike or member 34 carries a doffing sleeve 38 of non-metallic material, preferably of rubber or rubber-like qualities being inherently distortable and capable of returning to original configuration when the distorting influence is relaxed. Each sleeve is preferably conveniently formed of a section of fabric-reenforced hose, having naturally a central axial opening, the hose being cut to appropriate length after being selected for size, as to both outside diameter and cross-sectional dimension of its central opening, to fit the outer peripheral sleeve-receiving surface of the associated member or spike 34 to establish a gripping action and frictional engagement between the sleeve-receiving surface of the member and the member-receivable surface afforded by the interior of the central opening in the sleeve, in such manner that during normal operation the sleeve is constrained against rotation relative to the spike. In this manner, the spikes or members 34 are appropriately covered with material adequate to doff the cotton from the spindle 16. As the doffer is used, certain of the sleeves 38 will become worn, some perhaps more than others. The fit of each sleeve 38 relative to its member 34 is further such that the sleeve 38 may be forcibly rotated to assume a new position relative to the carrying member 34, thereby presenting another portion of its exterior surface as a doffing element or doffing surface portion. The numeral 40 is used here to designate the lower surface portion of the sleeve. It will be observed that this portion is a doffing element, since it moves through a radial doffing plane and thus cooperates with the upper portion of the associated spindle 16 during the doffing operation. Of course, as each sleeve 38 is rotated to present a new doffing element, a different portion of the sleeve will be presented to the doffing plane for cooperation with the spindle, but nevertheless the doffing portion will always be lowermost.

The fit between each sleeve 38 and its associated member or spike 34 is still further such that in the event that the sleeve becomes substantially worn to an extent in which further use thereof is contraindicated, the sleeve may be forcibly removed manually and a new one installed on the member 34 in its place. Removal and installation is endwise off of and onto the free or outer end of the member 34 and the gripping action and frictional engagement between the sleeve and member constitute the sole means of retention.

In that form of the invention shown in Fig. 4, each member 34 carries a doffing sleeve 38a, the fit of which on the member 34 is identical to that between the members 34 and 38. The doffing sleeve 38a has a thickened under portion 40a which provides the doffing element. Because of the thickened portion at 40a, it is not contemplated that rotation of the sleeve 38 relative to its carrying member 34 will be involved. Instead, when the portion 40a wears beyond further usefulness, the entire sleeve will be removed and replaced by a new one.

In Fig. 5, each member 34 is replaced by a member 34b that is non-circular in section, at least in the portion that receives a doffing sleeve 38b. In this particular case, the section of the member 34b is square; although, it could be otherwise. The purpose of the non-circular section is to provide a more positive fit between the member and its carried sleeve 38b. The sleeve 38b may be identical to the sleeve 38 previously described; although, the sleeve 38b may need a somewhat larger inside diameter in order to be forced over the square member 34b. Again, the under portion of the sleeve 38b is the doffing element, designated here by the numeral 40b.

Fig. 6 shows a still further modified form of member 34, designated here by the reference character 34c. The doffing sleeve is also of different configuration and is identified generally by the numeral 38c. As shown, the cross-sectional shape of the member 34c is in the form of a T, having a crossbar 35c and a depending leg 37c. The sleeve 38 is likewise of T-shaped cross section and complements the T-shaped cross section of the member 34c. The depending portion or leg of the T of the sleeve 38c is designated by the reference character 40c, in which case the sleeve has, as in the case of Fig. 4, a thickened portion serving as the doffing element. Also, as in Fig. 4, it is not contemplated that the sleeve 38c will be rotated relative to the member 34c in the event of wear. Instead, the sleeve 38c will be removed and a new one installed in its place. Fig. 7 shows a modified construction to take the place of the welded-in spike design of Fig. 1. In this case, the doffer 22 may be made up of a central support member 24d, having therein a plurality of tapped bores or apertures 32d for receiving the threaded inner ends of a plurality of members or spikes 34d. Either of the doffing sleeves of Fig. 3 or 4 may be utilized on the members 34d. Likewise, the members 34d may be made of different cross sections as suggested in Figs. 5 and 6.

The fundamental concept involved is to provide an economical doffer, having as its principal features the low cost provision of doffing sleeves in the first place and the ease of maintaining the doffer assembly in efficient operating condition because of the capability of the doffing sleeves to be either rotated for presenting new doffing surfaces or to be completely replaced. As in the cases of Figs. 3 and 5, for example, the features of rotation and ultimate replacement are combined, since a worn sleeve may be turned on its carrying member 34 to present as many doffing surfaces as are available until the sleeve is worn beyond further use.

Other features and advantages of the invention, not specifically enumerated herein, may be readily achieved, as will numerous modifications and variations in the preferred forms of the invention illustrated, all without departing from the spirit and scope of the invention.

What is claimed is:

1. A cotton picker doffer of the character described, comprising: a rotatable central support having rigid thereon a plurality of circumferentially spaced elongated members projecting radially therefrom in spokelike fashion, and a plurality of doffing sleeves, one for each member, respectively carried by the members and respectively having exterior doffing surface portions positioned to lie in a radial doffing plane; each member being of substantially uniform cross-section throughout its length and presenting an outer, peripheral sleeve-receiving surface; each sleeve being elongated substantially on the order of its associated member and having a central opening therethrough provided with an interior member-receivable surface cooperative with the sleeve-receiving surface of the associated member to provide a slip on-slip off fit between said sleeve and member; the cross-sectional dimensions of the sleeve opening and of the member being relatively different and at least the interior portion of the sleeve bordering its central opening being of yieldable distortable material capable of returning to original configuration so that the slip on fit is characterized by a gripping action of the sleeve on its member because of said yieldable material and also by frictional engagement between the cooperative sleeve-receiving and member-receivable surfaces sufficient to retain the sleeves on their members during normal operation, said gripping action and frictional engagement comprising the sole means of retention of each sleeve on its member and said gripping action and frictional engagement having the further characteristic of enabling manual removal of a sleeve endwise off its member in a radially outward direction.

2. The invention defined in claim 1, in which: the cross-sectional dimensions of the member and the central opening of its sleeve are further such relative to each other that the sleeve is constrained against rotation relative to its member during normal operation but may be manually forcibly rotated so as to position another exterior doffing surface portion of the sleeve in the doffing plane.

3. The invention defined in claim 1, in which: each member is of non-circular cross-section and its sleeve is tightly received thereby in such fashion that the sleeve is constrained against rotation relative to its member during normal operation.

4. The invention defined in claim 1, in which: each member is of non-circular cross-section and its sleeve is tightly received thereby in such fashion that the sleeve is constrained against rotation relative to its member during normal operation but may be forcibly so rotated to position another exterior surface portion of the sleeve to the doffing plane.

5. The invention defined in claim 1, in which: each member is of square cross-section and its sleeve is tightly received thereby in such fashion that the sleeve is constrained against rotation relative to its member during normal operation but may be forcibly so rotated to position another exterior doffing surface portion of the sleeve to the doffing plane.

6. The invention defined in claim 1, in which: each member is of T-shaped cross-section and its sleeve is tightly received thereby in such fashion that the sleeve is constrained against rotation relative to its member during normal operation.

7. The invention defined in claim 1, in which: each member is of T-shaped cross-section and its sleeve is tightly received thereby in such fashion that the sleeve is constrained against rotation relative to its member during normal operation and each sleeve has its bore of corresponding T-shaped section to fit the member.

8. The invention defined in claim 1, in which: each member is of T-shaped cross-section and its sleeve is tightly received thereby in such fashion that the sleeve is constrained against rotation relative to its member during normal operation and each sleeve has its bore of corresponding T-shaped cross-section to fit the member and each sleeve is further of similar T-shaped section and the free end of the leg of the T constitutes the exterior doffing surface portion.

9. The invention defined in claim 1, in which: each sleeve has a thickened wall portion running lengthwise thereof and the outer surface of the wall portion constitutes the exterior doffing surface portion.

10. The invention defined in claim 1, in which: each sleeve is of rubber-like material.

11. The invention defined in claim 10, in which: each sleeve is reenforced with material other than said rubber-like material.

12. The invention defined in claim 1, in which: each sleeve is a section of rubber-like hose cut to length to fit the associated member.

13. The invention defined in claim 1, in which: the central support comprises a plurality of axially spaced circular rows of tapped apertures and the members are in the form of spikes equal in number to the apertures and having threaded ends and respectively received by the apertures.

References Cited in the file of this patent

UNITED STATES PATENTS

| | | |
|---|---|---|
| 1,067,691 | Teel | July 15, 1913 |
| 1,208,591 | Lovejoy | Dec. 12, 1916 |
| 1,219,204 | Ward | Mar. 13, 1917 |
| 2,247,682 | Hagen | July 1, 1941 |
| 2,512,109 | Lucius | June 20, 1950 |
| 2,619,784 | Paradise | Dec. 2, 1952 |